United States Patent
Okamatsu et al.

(10) Patent No.: US 9,676,979 B2
(45) Date of Patent: Jun. 13, 2017

(54) LIQUID COAGULANT AND TIRE PUNCTURE SEALING MATERIAL SET

(71) Applicant: THE YOKOHAMA RUBBER CO., LTD., Minato-Ku, Tokyo (JP)

(72) Inventors: Takahiro Okamatsu, Kanagawa (JP); Kazushi Kimura, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 21 days.

(21) Appl. No.: 14/984,669

(22) Filed: Dec. 30, 2015

(65) Prior Publication Data

US 2016/0108299 A1    Apr. 21, 2016

Related U.S. Application Data

(62) Division of application No. 13/699,809, filed as application No. PCT/JP2011/061540 on May 19, 2011, now abandoned.

(30) Foreign Application Priority Data

May 27, 2010  (JP) ................................ 2010-121341

(51) Int. Cl.
| | |
|---|---|
| B29C 73/16 | (2006.01) |
| C09K 3/10 | (2006.01) |
| C08L 75/04 | (2006.01) |
| B29C 73/02 | (2006.01) |
| B29L 30/00 | (2006.01) |
| B29K 23/00 | (2006.01) |
| B29K 105/04 | (2006.01) |

(52) U.S. Cl.
CPC .......... C09K 3/1021 (2013.01); B29C 73/025 (2013.01); B29C 73/163 (2013.01); C08L 75/04 (2013.01); B29K 2023/083 (2013.01); B29K 2105/04 (2013.01); B29L 2030/00 (2013.01); C09K 2200/0429 (2013.01); C09K 2200/0607 (2013.01); C09K 2200/0622 (2013.01)

(58) Field of Classification Search
CPC ........................... B29C 73/025; B29C 73/163
USPC ......................................................... 523/166
See application file for complete search history.

(56) References Cited

U.S. PATENT DOCUMENTS

| | | | |
|---|---|---|---|
| 4,012,246 | A | 3/1977 | Forrest |
| 4,487,642 | A | 12/1984 | Takashima et al. |
| 4,501,825 | A | 2/1985 | Magyar et al. |
| 6,454,892 | B1 | 9/2002 | Gerresheim et al. |
| 6,889,723 | B2 | 5/2005 | Gerresheim et al. |
| 6,992,119 | B2 | 1/2006 | Kojima et al. |
| 7,037,396 | B2 | 5/2006 | Naito et al. |
| 7,745,511 | B2 | 6/2010 | Okamatsu et al. |
| 7,759,412 | B2 | 7/2010 | Okamatsu |
| 2002/0111418 | A1 | 8/2002 | Konno et al. |
| 2002/0155072 | A1 | 10/2002 | Knuppel et al. |
| 2004/0140042 | A1 | 7/2004 | Teratani et al. |
| 2005/0070619 | A1 | 3/2005 | Miller |

FOREIGN PATENT DOCUMENTS

| | | |
|---|---|---|
| JP | 61-014277 A | 1/1986 |
| JP | 3210863 B2 | 9/2001 |
| JP | 2002-332475 A | 11/2002 |
| JP | 2004-035867 A | 2/2004 |
| JP | 2006-167952 A | 6/2006 |
| JP | 2007-224245 A | 9/2007 |
| JP | 2007-224246 A | 9/2007 |
| JP | 2007-224248 A | 9/2007 |
| JP | 2009-051893 A | 3/2009 |
| JP | 4245654 B2 | 3/2009 |

*Primary Examiner* — Edward Cain
(74) *Attorney, Agent, or Firm* — Carrier Blackman & Associates, P.C.; Joseph P. Carrier; William D. Blackman

(57) ABSTRACT

Disclosed is a liquid coagulant which can be injected into the inside of a tire without the need of removing the tire from a rim and which can prevent the scattering of a residue of a tire puncture sealing material when the tire is removed from the rim. The liquid coagulant can coagulate an emulsion that contains natural rubber latex and/or a synthetic resin emulsion. The liquid coagulant contains a foaming agent capable of foaming the emulsion. Also disclosed is a tire puncture sealant set including the coagulant and a method of coagulating a tire puncture sealant.

6 Claims, No Drawings

LIQUID COAGULANT AND TIRE PUNCTURE SEALING MATERIAL SET

CROSS REFERENCE TO RELATED APPLICATIONS

The present application is a divisional application of U.S. Ser. No. 13/699,809, filed Nov. 26, 2012, which is the US National Phase Application of International Application PCT/JP2011/061540, filed on May 19, 2011, which claims priority to Japanese patent application No. 2010-121341, filed May 27, 2010. The entire subject matter of these priority documents, including specification claims and drawings thereof, is incorporated by reference herein.

TECHNICAL FIELD

The present invention relates to liquid coagulants and tire puncture sealant sets.

BACKGROUND ART

A known tire puncture sealant for repairing a punctured tire is obtained by blending a natural rubber latex with a tackifying resin emulsion and an antifreezing agent (see Patent Literatures 1 and 2, for instance).

The present applicant once proposed a blend of a synthetic resin emulsion and an antifreezing agent (see Patent Literatures 3 through 6, for instance).

Such a tire puncture sealant is generally injected into a tire through a portion (valve) for tire inflation, and reaches a puncture hole when the car is driven after the tire is filled with air at a specified air pressure. Rubber particles in the tire puncture sealant form aggregates in the tire by the action of a compressive or shearing force exerted on them when the rotating tire comes into contact with the ground, and the formed aggregates seal the puncture hole to enable the driving of the car.

The tire as repaired with the above tire puncture sealant has the non-aggregated tire puncture sealant (liquid components) remaining therein. The tire puncture sealant normally contains an antifreezing agent such as ethylene glycol, so that the tire puncture sealant remaining in a tire needs to be recovered when the tire is changed or at the end of use of the tire.

In order to meet such requirement, the present applicant has proposed as a coagulant for tire puncture sealants "an emulsion coagulant for coagulating a tire puncture sealant containing emulsion particles, comprising: a mineral which induces aggregation of the emulsion particles by either one or both of weakening of surface charge of the emulsion particles and formation of hydrogen bond between the mineral and the emulsion particles; and a gelation agent" (Patent Literature 7).

CITATION LIST

Patent Literature

Patent Literature 1: JP 2004-035867 A
Patent Literature 2: JP 3210863 B
Patent Literature 3: JP 2007-224245 A
Patent Literature 4: JP 2007-224246 A
Patent Literature 5: JP 2007-224248 A
Patent Literature 6: JP 2009-51893 A
Patent Literature 7: JP 4245654 B

SUMMARY OF INVENTION

Technical Problems

It, however, is necessary for the addition of the emulsion coagulant as disclosed in Patent Literature 7 to remove a tire in advance from the rim, and a tire puncture sealant remaining in the tire (hereafter also referred to as "residual tire puncture sealant") may splash when the tire is removed from the rim.

An object of the present invention is to provide a liquid coagulant capable of being injected into a tire without removing the tire from the rim, and capable of preventing a residual tire puncture sealant from splashing when the tire is removed from the rim.

Solution to Problems

As a result of diligent research, the present inventors found that the liquid coagulant which comprises a blowing agent is capable of being injected into a tire without removing the tire from the rim, and capable of in-situ coagulation of a tire puncture sealant remaining within the tire, so as to complete the present invention.

In other words, the present invention provides the following (1) through (11).

(1) A liquid coagulant for coagulating an emulsion containing a natural rubber latex and/or a synthetic resin emulsion,
comprising a blowing agent for foaming the emulsion.

(2) The liquid coagulant according to (1) as above, wherein the blowing agent is a reactive blowing agent using a urethane resin and/or an acrylic resin having two or more carboxy groups and a hydrogencarbonate salt.

(3) The liquid coagulant according to (1) as above, wherein the blowing agent is a reactive blowing agent using a polyisocyanate compound.

(4) The liquid coagulant according to any one of (1) through (3) as above, wherein the synthetic resin emulsion is at least one selected from the group consisting of an ethylene vinyl acetate emulsion, an acrylic emulsion, and a urethane emulsion.

(5) The liquid coagulant according to any one of (1) through (4) as above, further comprising an antifreezing agent.

(6) The liquid coagulant according to (5) as above, wherein the antifreezing agent is at least one selected from the group consisting of ethylene glycol, propylene glycol, diethylene glycol, glycerin, methanol, ethanol, and isopropyl alcohol.

(7) The liquid coagulant according to any one of (1) through (6) as above, wherein the emulsion is a tire puncture sealant which further contains an antifreezing agent.

(8) The liquid coagulant according to (7) as above, wherein the antifreezing agent is at least one selected from the group consisting of ethylene glycol, propylene glycol, diethylene glycol, glycerin, methanol, ethanol, and isopropyl alcohol.

(9) A tire puncture sealant set, comprising: a tire puncture sealant which contains a natural rubber latex, a synthetic resin emulsion, and an antifreezing agent; and the liquid coagulant according to any one of (1) through (6) as above.

(10) The tire puncture sealant set according to (9) as above, wherein the synthetic resin emulsion is at least one selected from the group consisting of an ethylene vinyl acetate emulsion, an acrylic emulsion, and a urethane emulsion.

(11) The tire puncture sealant set according to (9) or (10) as above, wherein the antifreezing agent is at least one selected from the group consisting of ethylene glycol, propylene glycol, diethylene glycol, glycerin, methanol, ethanol, and isopropyl alcohol.

Advantageous Effects of Invention

As demonstrated below, the liquid coagulant according to the present invention is capable of being injected into a tire without removing the tire from the rim, and capable of preventing a residual tire puncture sealant from splashing when the tire is removed from the rim.

The liquid coagulant of the invention is very useful because it not only prevents splashing of a residual tire puncture sealant when a tire is removed from the rim but ensures the safety of workers by preventing pollution due to the splashing.

DESCRIPTION OF EMBODIMENTS

In the following, the present invention is described in detail.

The liquid coagulant of the invention is a liquid coagulant for coagulating an emulsion containing a natural rubber latex and/or a synthetic resin emulsion, which coagulant contains a blowing agent for foaming the emulsion to be coagulated.

While a liquid state may be based on water or a solvent, a water-based liquid state is preferable in terms of the compatibility of the liquid coagulant of the invention with the emulsion to be coagulated.

Ingredients of the inventive liquid coagulant are detailed below.

[Blowing Agent]

The blowing agent to be used in the liquid coagulant of the invention is not particularly limited as long as it is added to the emulsion to be coagulated, so as to foam the emulsion. Available blowing agents are broadly classified into chemical ones and physical ones.

Examples of chemical blowing agents include inorganic blowing agents, such as those based on the reaction between a hydrogencarbonate salt and an acid, and those based on the thermal decomposition of a carbonate salt or the like; and organic blowing agents, such as those based on the reaction of a polyisocyanate compound, and those based on the thermal decomposition of at least one selected from the group consisting of an azo compound, a hydrazine derivative, a semicarbazide compound, an azide, a nitroso compound, a triazole compound, a tetrazole compound, and a bicarbonate salt.

Specific examples of physical blowing agents include inorganic blowing agents such as a hollow glass balloon; and organic blowing agents such as pentane and dichroloethane.

More suitably used are chemical blowing agents, with those of a reactive type being even more suitable because of an adequate amount of foaming attained. Suitable chemical blowing agents of a reactive type are detailed below.

<Reactive Inorganic Blowing Agent>

Examples of reactive inorganic blowing agents include the blowing agents based on the reaction between a hydrogencarbonate salt and an acid as mentioned above.

The hydrogencarbonate salt is specifically exemplified by lithium hydrogencarbonate, sodium hydrogencarbonate, potassium hydrogencarbonate, rubidium hydrogencarbonate, cesium hydrogencarbonate, magnesium hydrogencarbonate, and calcium hydrogencarbonate, which may be used alone or as a combination of two or more out of them.

Among others, sodium hydrogencarbonate is preferable because of its high availability and good handleability.

In the present invention, the hydrogencarbonate salt, as readily reacting with an acid described later to generate carbon dioxide, is so used as to be added to the emulsion to be coagulated separately from the acid. For instance, the hydrogencarbonate salt may be blended into the emulsion in advance or, upon use of the liquid coagulant of the invention, added to the emulsion prior to other ingredients.

The acid to be reacted with the hydrogencarbonate salt is not particularly limited as long as it is a compound having a carboxy group. The acid is preferably a urethane resin and/or an acrylic resin having two or more carboxy groups because the property of coagulating the emulsion to be coagulated is further improved.

(Urethane Resin)

Examples of the above urethane resin having two or more carboxy groups include a urethane resin obtained by the method in which a polyisocyanate compound is reacted with a polyol compound and a polycarboxylic acid having a hydroxy group such that the hydroxy groups of the polyol compound and the polycarboxylic acid are excessive in total with respect to the isocyanate groups (NCO groups).

The polyisocyanate compound to be used for the synthesis of the urethane resin is not particularly limited as long as it has two or more isocyanate groups in the molecule.

Specific examples of the polyisocyanate compound include aromatic polyisocyanates, such as TDIs (e.g., 2,4-tolylene diisocyanate (2,4-TDI), 2,6-tolylene diisocyanate (2,6-TDI)), MDIs (e.g., 4,4'-diphenylmethane diisocyanate (4,4'-MDI), 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic polyisocyanates, such as hexamethylene diisocyanate (HDI), trimethylhexamethylene diisocyanate (TMHDI), lysine diisocyanate, and norbornane diisocyanate (NBDI); alicyclic polyisocyanates, such as trans-cyclohexane-1,4-diisocyanate, isophorone diisocyanate (IPDI), bis(isocyanate methyl)cyclohexane ($H_6XDI$), and dicyclohexylmethane diisocyanate ($H_{12}MDI$); carbodiimide-modified polyisocyanates derived from such polyisocyanates; isocyanurate-modified polyisocyanates derived from such polyisocyanates; and urethane prepolymers obtained by reacting such polyisocyanates with a polyol compound described later.

The above polyisocyanate compounds may be used alone or as a combination of two or more out of them.

Among others, tolylene diisocyanates (TDIs) are preferable because they yield urethane resins of low viscosity, and the inventive liquid coagulant including such a urethane resin is easy to handle.

The polyol compound to be used for the synthesis of the urethane resin is not particularly limited as long as it has two or more hydroxy groups.

The polyol compound is exemplified by polyether polyols and polyester polyols.

Exemplary polyether polyols include a polyol obtained by adding at least one selected from the group consisting of ethylene oxide, propylene oxide, butylene oxide, and polyoxy tetramethylene oxide to at least one selected from the group consisting of ethylene glycol, diethylene glycol, propylene glycol, dipropylene glycol, glycerin, 1,1,1-trimethylolpropane, 1,2,5-hexanetriol, 1,3-butanediol, 1,4-butanediol, and pentaerythritol.

Specifically, polyethylene glycol (polyethylene oxide), polypropylene glycol (polypropylene oxide), polypropylene triol, an ethylene oxide/propylene oxide copolymer, polytetramethylene ether glycol (PTMEG), polytetraethylene glycol, and sorbitol-type polyols are mentioned as preferred examples.

Specific examples of polyester polyols include a condensation polymer between at least one selected from the group consisting of ethylene glycol, propylene glycol, butanediol, pentanediol, hexanediol, glycerin, 1,1,1-trimethylolpropane and other low-molecular polyols, and at least one selected from the group consisting of glutaric acid, adipic acid, pimelic acid, suberic acid, sebacic acid, dimer acids and other aliphatic carboxylic acids, castor oil and other hydroxycarboxylic acids, as well as oligomer acids; and ring-opened polymers, such as propiolactone and valerolactone.

The above polyol compounds may be used alone or as a combination of two or more out of them.

Among others, polyether polyols, to be more specific, polyethylene glycol (polyethylene oxide), polypropylene glycol (polypropylene oxide), and ethylene oxide/propylene oxide copolymers are preferable because the property of coagulating the emulsion to be coagulated is further improved.

The polycarboxylic acid having a hydroxy group to be used for the synthesis of the urethane resin is not particularly limited as long as it is a compound having one or more hydroxy groups and two or more carboxy groups.

Specific examples of the polycarboxylic acid include citric acid, dihydroxysuccinic acid (tartaric acid), and malic acid, which may be used alone or as a combination of two or more out of them.

Citric acid is preferable because of its high availability and good handleability.

(Acrylic Resin)

Examples of the above acrylic resin having two or more carboxy groups include an acrylic resin obtained by the method in which a polycarboxylic acid having a hydroxy group is added to an acrylamide polymer having an amido group so as to introduce a carboxy group.

Specific examples of the acrylamide polymer to be used for the synthesis of the acrylic resin include poly-N-ethyl acrylamide, poly-N-n-propyl acrylamide, poly-N-isopropyl acrylamide, poly-N-cyclopropyl acrylamide, poly-N,N-diethyl acrylamide, poly-N-methyl-N-ethyl acrylamide, poly-N-methyl-N-n-propyl acrylamide, poly-N-methyl-N-isopropyl acrylamide, poly-N-acryloyl piperidine, poly-N-acryloyl pyrrolidine, poly-N-acryloyl morpholine, poly-N-methoxypropyl acrylamide, poly-N-ethoxypropyl acrylamide, poly-N-isopropoxypropyl acrylamide, poly-N-ethoxyethyl acrylamide, poly-N-(2,2-dimethoxyethyl)-N-methyl acrylamide, poly-N-1-methyl-2-methoxyethyl acrylamide, poly-N-1-methoxymethylpropyl acrylamide, poly-N-di(2-methoxyethyl) acrylamide, poly-N-2-methoxyethyl-N-n-propyl acrylamide, poly-N-2-methoxyethyl-N-ethyl acrylamide, poly-N-2-methoxyethyl-N-isopropyl acrylamide, poly-N-methoxyethoxypropyl acrylamide, poly-N-tetrahydrofurfuryl acrylamide, poly-N-(1,3-dioxolan-2-yl)methyl acrylamide, poly-N-methyl-N-(1,3-dioxolan-2-yl)methyl acrylamide, poly-N-cyclopropylacrylamide, poly-N-pyrrolidinomethyl acrylamide, poly-N-piperidinomethyl acrylamide, poly-N-2-morphorinoethyl acrylate, poly-N-2-morphorinoethoxyethyl acrylate, and methacrylates corresponding thereto.

The polycarboxylic acid having a hydroxy group to be used for the synthesis of the acrylic resin is specifically exemplified by those polycarboxylic acids as mentioned above with respect to the urethane resin.

In the present invention, it is preferable that the urethane resin and acrylic resin as described above, both having two or more carboxy groups, additionally have a cationic functional group because the property of coagulating the emulsion to be coagulated is further improved.

A cationic functional group refers to a functional group having a cation.

Specific examples of the cation include an ammonium ion, a phosphonium ion, an imidazolium ion, a pyridinium ion, a pyrrolidinium ion, and a piperidinium ion. Among others, a quaternary ammonium ion is preferable because of its good handleability.

The cationic functional group may be introduced by the method in which, during the synthesis of the urethane resin, an amine compound (e.g., N-methyl diethanolamine, triethylamine) is caused to react along with a polycarboxylic acid having a hydroxy group, and an organic acid (e.g., formic acid, acetic acid, oxalic acid) is added to the resultant reaction product.

<Reactive Organic Blowing Agent>

Examples of reactive organic blowing agents include the blowing agents based on the reaction of a polyisocyanate compound as mentioned before.

The polyisocyanate compound is specifically exemplified by polyisocyanate compounds usable for the synthesis of the urethane resin as described before, among which a urethane prepolymer is preferable because the property of coagulating the emulsion to be coagulated is further improved.

The reactant which reacts with the polyisocyanate compound is water, which, in the present invention, may be water separately added to the emulsion to be coagulated, or water present in the emulsion to be coagulated.

The embodiment where a tire puncture sealant is coagulated using such a reactive chemical blowing agent as described above is specifically exemplified by the embodiment where the solution, which contains the above urethane resin and/or acrylic resin having two or more carboxy groups as well as water, an antifreezing agent, and so forth described later, is added into a tire through a valve, then the hydrogencarbonate salt as described before is added through a gap between the deflated tire and the rim; and the embodiment where a solution obtained by dissolving the polyisocyanate compound as described above in a solvent described later is added into a tire through a valve.

The liquid coagulant of the invention that contains the blowing agent as described above is excellent in property of coagulating the emulsion to be coagulated, and is capable of being injected into a tire without removing the tire from the rim, and coagulating a residual tire puncture sealant within the tire.

The reason for an excellent coagulating property is considered to lie in that the emulsion is reduced in flowability due to foams generated therein by the blowing agent. Particularly, the reason for the fact that the coagulating property is further improved by using as ingredients of the blowing agent a urethane resin and the like having two or more carboxy groups is considered to lie in that foams with a higher strength are generated, so that the flowability of the emulsion is further decreased.

<Water/Solvent>

The liquid coagulant of the invention may contain water or a solvent as required from the viewpoint of the capability of being injected into a tire (handleability), and so forth.

The solvent is chiefly to be contained if the polyisocyanate compound as above is used as a reactive blowing agent. Such organic solvents as ethyl acetate, acetone, and methyl ethyl ketone are suitably mentioned as specific examples of the solvent in terms of the compatibility with water in the emulsion to be coagulated.

If water or a solvent is contained, the water/solvent content is preferably 50 to 300 parts by weight, and more preferably 100 to 200 parts by weight on 100 parts by weight of the blowing agent as described above (exclusive of the hydrogencarbonate salt and water as a reactive blowing agent).

<Antifreezing Agent>

The liquid coagulant of the invention may contain an antifreezing agent as required.

The antifreezing agent to be contained is not particularly limited, with a conventional antifreezing agent being available.

Exemplary antifreezing agents specifically include ethylene glycol, propylene glycol, diethylene glycol, glycerin, methanol, ethanol and isopropyl alcohol, which may be used alone or as a combination of two or more out of them.

Use of propylene glycol is preferable because the viscosity of the inventive liquid coagulant can be designed to be low, and use of propylene glycol and methanol in combination is preferable because an excellent coagulating property of the inventive liquid coagulant can be maintained.

If the above antifreezing agent is to be contained, the antifreezing agent content is preferably 20 to 400 parts by weight, and more preferably 100 to 300 parts by weight on 100 parts by weight of the blowing agent as described above (exclusive of the hydrogencarbonate salt and water as a reactive blowing agent).

The following description is made on the emulsion to be coagulated with the liquid coagulant of the invention.

The emulsion is not particularly limited as long as it contains a natural rubber latex and/or a synthetic resin emulsion, but is preferably a tire puncture sealant further containing an antifreezing agent because the effects of the inventive liquid coagulant can fully be exerted thereon.

Ingredients of the emulsion (tire puncture sealant) to be coagulated with the liquid coagulant of the invention are detailed below.

<Natural Rubber Latex>

The natural rubber latex to be used in the emulsion, or tire puncture sealant, is not particularly limited, with a conventional natural rubber latex being available.

Exemplary natural rubber latices specifically include a latex collected by tapping *Hevea brasiliensis*, and a so-called "deproteinized natural rubber latex" obtained by removing proteins from a natural rubber latex.

<Synthetic Resin Emulsion>

The synthetic resin emulsion to be used in the emulsion, or tire puncture sealant, is not particularly limited, with a conventional synthetic resin emulsion being available.

Exemplary synthetic resin emulsions specifically include an ethylene vinyl acetate emulsion, an acrylic emulsion and a urethane emulsion, which may be used alone or as a combination of two or more out of them.

As the above synthetic resin emulsions, their respective examples as mentioned in Patent Literature 7 may be used.

The synthetic resin content preferably makes the blending ratio between the solids in the natural rubber latex and in the synthetic resin emulsion (the natural rubber latex/the synthetic resin emulsion) 5/95 to 95/5, more preferably 20/80 to 50/50.

<Antifreezing Agent>

The antifreezing agent to be used in the tire puncture sealant is not particularly limited, with a conventional antifreezing agent being available.

Exemplary antifreezing agents include those as mentioned above with respect to the liquid coagulant of the invention.

The antifreezing agent content is preferably 20 to 400 parts by weight, and more preferably 100 to 300 parts by weight on 100 parts by weight of the solids in the natural rubber latex and/or the synthetic resin emulsion. If the natural rubber latex and the synthetic resin emulsion are both contained, the antifreezing agent content is based on 100 parts by weight of the whole solid content in the natural rubber latex and the synthetic resin emulsion.

<Tackifier>

The tire puncture sealant to be coagulated with the liquid coagulant of the invention may contain a tackifier from the viewpoint of the sealing property.

The tackifier to be contained is not particularly limited, with a conventional antifreezing agent being available. Specific examples include rosin-based resins, such as a rosin resin, a polymerized rosin resin, a rosin ester resin, a polymerized rosin ester resin, and a modified rosin; terpene phenol resins; terpene resins, such as an aromatic terpene; hydrogenated terpene resins obtained by hydrogenation of a terpene resin; phenol resins; and xylene resins.

The tackifier content is preferably 20 to 100 parts by weight, and more preferably 30 to 80 parts by weight on 100 parts by weight of the whole solids in the natural rubber latex and/or the synthetic resin emulsion. If the natural rubber latex and the synthetic resin emulsion are both contained, the tackifier content is based on 100 parts by weight of the whole solid content in the natural rubber latex and the synthetic resin emulsion.

<Additive>

Apart from the ingredients as described above, the tire puncture sealant to be coagulated with the liquid coagulant of the invention may contain, as desired or required, various additives such as a filler, an anti-aging agent, an antioxidant, a pigment (dye), a plasticizer, a thixotropic agent, an ultra-violet absorber, a flame retardant, a surfactant (including a leveling agent), a dispersant, a dehydrating agent, and an antistatic agent.

As the above additives, their respective examples as mentioned in Patent Literature 7 may be used.

The tire puncture sealant set of the invention is as follows.

The tire puncture sealant set of the invention includes a tire puncture sealant containing a natural rubber latex, a synthetic resin emulsion and an antifreezing agent, and the liquid coagulant of the invention as described before.

The tire puncture sealant in the tire puncture sealant set of the invention is such a tire puncture sealant as described to be coagulated with the inventive liquid coagulant as described before.

The amount (as solids) of the liquid coagulant of the invention to be used when a puncture hole is sealed using the tire puncture sealant set of the invention is not particularly limited because the content of the tire puncture sealant which actually remains in the tire is often unknown, while the usage amount of the inventive coagulant is preferably about 50 to 200 parts by weight, and more preferably about 100 to 150 parts by weight on 100 parts by weight of the solids in the tire puncture sealant as used.

The tire puncture sealant set of the invention makes it possible not only to promptly repair the punctured tire of a car using the tire puncture sealant in the set so as to continue driving the car, but readily change the tire at a service station or the like in the neighborhood depending on the influence on the roadability or the lifetime of the tire by coagulating the tire puncture sealant remaining in the tire with the liquid coagulant of the invention.

EXAMPLES

The present invention is illustrated in reference to the following examples, to which the present invention is in no way limited.

<Preparation of Tire Puncture Sealant>

A tire puncture sealant was prepared by using an agitator to mix together the ingredients of the sealant that are listed in Table 1 below in the amounts (in parts by weight) as set forth in the same table.

TABLE 1

| Tire puncture sealant | |
|---|---|
| Emulsion 1 | 50 |
| Emulsion 2 | 50 |
| Antifreezing agent | 100 |
| Surfactant A | 1.5 |
| Surfactant B | 0.45 |
| Total amount | 201.95 |
| Solid content (%) | 27.3 |

The tire puncture sealant ingredients as listed in Table 1 are specifically as follows.

Emulsion 1: A natural rubber emulsion (HA latex; solid content, 60 wt %; manufactured by Golden Hope Corporation).

Emulsion 2: An ethylene vinyl acetate emulsion (solid content, 51 wt %; Sumikaflex S-408HQE manufactured by Sumika Chemtex Co., Ltd.).

Antifreezing agent: Propylene glycol (solid content, 100 wt %; manufactured by Wako Pure Chemical Industries, Ltd.).

Surfactant A: Dodecyl sodium sulfate (manufactured by Wako Pure Chemical Industries, Ltd.).

Surfactant B: Polyoxyethylene alkyl ether (EMULGEN 109 manufactured by Kao Corporation).

Preparation of Liquid Coagulant

Examples 1 through 7

A polyisocyanate compound (TDI manufactured by Mitsui Chemicals, Inc.), a polyol compound (ethylene oxide-terminated polypropylene glycol; CMC252 manufactured by ADEKA Corporation), a polycarboxylic acid having a hydroxy group (citric acid), and an amine compound (N-methyl diethanolamine), each in the amounts (in parts by weight) as set forth in Table 2 below, were initially mixed and reacted together to obtain urethane resins each having two or more carboxy groups.

To the urethane resins thus obtained, an acid (formic acid) was added in the amounts as set forth in the same table, so as to convert a tertiary amino group derived from the amine compound into a cationic functional group (group having a quaternary ammonium ion).

Subsequently, the water and antifreezing agents (propylene glycol and methanol) as listed in Table 2 were added in the amounts as set forth in the same table, to thereby yield liquid coagulants.

Example 8

By following the procedure of Example 1 except that the acid (formic acid) was not used, a liquid coagulant was prepared.

Example 9

By following the procedure of Example 5 except that the antifreezing agents (propylene glycol and methanol) were not used, a liquid coagulant was prepared.

Comparative Example 1

By following the procedure of Example 1 except that the polycarboxylic acid having a hydroxy group (citric acid) was not used, a liquid coagulant was prepared.

Comparative Example 2

By following the procedure of Example 1 except that the polycarboxylic acid having a hydroxy group (citric acid) was not used, and dimethylolbutanoic acid (manufactured by Perstorp Corporation) was used as an acid in the amount (in parts by weight) as set forth in Table 2 below, a liquid coagulant was prepared.

TABLE 2

| | Example | | | | | | | | | Comparative Example | |
|---|---|---|---|---|---|---|---|---|---|---|---|
| | 1 | 2 | 3 | 4 | 5 | 6 | 7 | 8 | 9 | 1 | 2 |
| Polyisocyanate compound | 20 | 20 | 20 | 20 | 20 | 20 | 20 | 20 | 20 | 20 | 20 |
| Polyol compound | 145 | 145 | 145 | 145 | 145 | 145 | 145 | 145 | 145 | 145 | 145 |
| Polycarboxylic acid | 10 | 12 | 3 | 5 | 10 | 10 | 12 | 10 | 10 | 0 | 0 |
| Amine compound | 4.1 | 4.1 | 4.1 | 4.1 | 4.1 | 4.1 | 4.1 | 4.1 | 4.1 | 4.1 | 4.1 |
| Formic acid | 1.6 | 1.6 | 3.0 | 3.0 | 3.0 | 3.0 | 3.0 | 0.0 | 3.0 | 1.6 | 0.0 |
| Dimethylolbutanoic acid | 0.0 | 0.0 | 0.0 | 0.0 | 0.0 | 0.0 | 0.0 | 0.0 | 0.0 | 0.0 | 3.6 |
| Water | 213.0 | 213.0 | 213.0 | 213.0 | 213.0 | 213.0 | 213.0 | 213.0 | 213.0 | 213.0 | 213.0 |
| Propylene glycol | 35 | 35 | 35 | 35 | 50 | 35 | 35 | 35 | 0 | 35 | 35 |
| Methanol | 35 | 35 | 35 | 35 | 20 | 35 | 35 | 35 | 0 | 35 | 35 |
| Coagulating property | good | good | fair | fair | good | good | good | fair | good | poor | poor |
| Appearance at minus 20° C. | liquid | liquid | liquid | liquid | liquid | liquid | liquid | liquid | solid | liquid | liquid |

Example 10

By following the procedure of Example 1 except that polypropylene glycol (manufactured by Mitsui Chemicals, Inc.) was used as a polyol compound in the amount (in parts by weight) as set forth in Table 3 below, triethylamine was used as an amine compound in the amount as set forth in the same table, and that dimethylolbutanoic acid (manufactured by Perstorp Corporation) was used as an acid in the amount as set forth in the same table, a liquid coagulant was prepared.

Example 11

By following the procedure of Example 10 except that the acid (dimethylolbutanoic acid) was not used, a liquid coagulant was prepared.

Example 12

By following the procedure of Example 11 except that the polycarboxylic acid having a hydroxy group (citric acid) was used in the amount (in parts by weight) as set forth in Table 3 below, and the antifreezing agents (propylene glycol and methanol) were not used, a liquid coagulant was prepared.

Comparative Example 3

By following the procedure of Example 10 except that the polycarboxylic acid having a hydroxy group (citric acid) was not used, and dimethylolbutanoic acid was used in the amount (in parts by weight) as set forth in Table 3 below, a liquid coagulant was prepared.

TABLE 3

|  | Example | | | Comparative Example |
|---|---|---|---|---|
|  | 10 | 11 | 12 | 3 |
| Polyisocyanate compound | 20 | 20 | 20 | 20 |
| Polyol compound | 145 | 145 | 145 | 145 |
| Polycarboxylic acid | 10 | 10 | 20 | 0 |
| Amine compound | 4.8 | 4.8 | 4.8 | 4.8 |
| Dimethylolbutanoic acid | 5.0 | 0.0 | 0.0 | 3.5 |
| Water | 213.0 | 213.0 | 213.0 | 213.0 |
| Propylene glycol | 35 | 35 | 0 | 35 |
| Methanol | 35 | 35 | 0 | 35 |
| Coagulating property | good | fair | fair | poor |
| Appearance at minus 20° C. | liquid | liquid | solid | liquid |

Examples 13 and 14

In a solvent (ethyl acetate) in the amounts (in parts by weight) as set forth in Table 4 below, an isocyanate compound (TDI manufactured by Mitsui Chemicals, Inc.) and a polyol compound (ethylene oxide-terminated polypropylene glycol; CMC252 manufactured by ADEKA Corporation), each in the amounts as set forth in the same table, were mixed and reacted together to synthesize polyisocyanate compounds, that is to say, prepare liquid coagulants each having a polyisocyanate compound dissolved in the solvent.

Example 15

By following the procedure of Example 13 except that the antifreezing agents (propylene glycol and methanol) were not used, a liquid coagulant was prepared.

TABLE 4

|  | Example | | |
|---|---|---|---|
|  | 13 | 14 | 15 |
| Polyisocyanate compound | 20 | 30 | 20 |
| Polyol compound | 145 | 145 | 145 |
| Solvent | 200.0 | 200.0 | 200.0 |
| Propylene glycol | 35 | 35 | 0 |
| Methanol | 35 | 35 | 0 |
| Coagulating property | fair | fair | fair |
| Appearance at minus 20° C. | liquid | liquid | solid |

Examples 16 and 17

An acrylic resin emulsion having an acrylamide structure (solid content, 45%; manufactured by Asahi Kasei Chemicals Corporation) and a polycarboxylic acid having a hydroxy group (citric acid), each in the amounts (in parts by weight) as set forth in Table 5 below, were initially mixed and reacted together to obtain acrylic resins each having two or more carboxy groups.

To the acrylic resins thus obtained, an acid (formic acid) was added in the amounts as set forth in the same table, so as to convert an amido group of each acrylic resin into a cationic functional group (group having a quaternary ammonium ion).

Subsequently, the antifreezing agents (propylene glycol and methanol) as listed in Table 5 were added in the amounts as set forth in the same table, to thereby yield liquid coagulants.

Example 18

By following the procedure of Example 16 except that the antifreezing agents (propylene glycol and methanol) were not used, a liquid coagulant was prepared.

TABLE 5

|  | Example | | |
|---|---|---|---|
|  | 16 | 17 | 18 |
| Acrylic resin emulsion | 100 | 100 | 100 |
| Polycarboxylic acid | 10 | 12 | 12 |
| Acid | 1.0 | 1.0 | 1.0 |
| Propylene glycol | 35 | 35 | 0 |
| Methanol | 35 | 35 | 0 |
| Coagulating property | good | good | good |
| Appearance at minus 20° C. | liquid | liquid | solid |

<Evaluation>

(1) Coagulating Property

The liquid coagulants as prepared in Examples 1 through 12 and 16 through 18 as well as Comparative Examples 1 through 3 were each added in an amount of 60 ml and along with 30 g of sodium hydrogencarbonate within the tire without rim in which 600 ml of the tire puncture sealant as prepared by the above method had been placed. With respect to each of Examples 13 through 15, 60 ml of the liquid coagulant was added along with no sodium hydrogencarbonate.

Then, each tire was swung in its rolling directions, forward and backward, ten times (five times per direction) and each time by about 90 degrees.

Subsequently, the tires were left standing at 20° C. for five minutes before the presence of liquid components was visually examined.

If no liquid components were identified, the coagulant in question was evaluated as "good" in coagulating property. If the coagulant in question had practically no problem from the viewpoint of preventing the residual tire puncture sealant from splashing even though liquid components were slightly identified, it was evaluated as "fair." If liquid components were identified in large amounts, the coagulant in question was evaluated as "poor" in coagulating property. The evaluation results are shown in Tables 2 through 5.

(2) Appearance at Minus 20° C.

The liquid coagulants as prepared in Examples 1 through 18 and Comparative Examples 1 through 3 were visually observed on appearance at minus 20° C. (whether to appear solid or liquid). The results are shown in Tables 2 through 5.

It was found from the results as shown in Tables 2 through 5 that the liquid coagulants containing no blowing agent (Comparative Examples 1 through 3) were poor in coagulating property.

In contrast, the liquid coagulants containing a blowing agent (Examples 1 through 18) were each found to be good in coagulating property, and capable of preventing the residual tire puncture sealant from splashing.

As a result of the comparison between Examples 1 and 8, and between Examples 10 and 11, in particular, it was found that the coagulating property is made higher if the urethane resin which has not only carboxy groups but a cationic functional group is used as a blowing agent.

The invention claimed is:

1. A tire puncture sealant set, comprising:
    a tire puncture sealant which contains a natural rubber latex,
    a synthetic resin emulsion, and
    an antifreezing agent; and
    a liquid coagulant for coagulating the tire puncture sealant,
    wherein the liquid coagulant includes a blowing agent for foaming the tire puncture sealant, and the blowing agent is one of a reactive blowing agent using a urethane resin and/or an acrylic resin having two or more carboxy groups and a hydrogencarbonate salt; and a reactive blowing agent using a polyisocyanate compound.

2. The tire puncture sealant set according to claim 1, wherein the synthetic resin emulsion is at least one of an ethylene vinyl acetate emulsion, an acrylic emulsion, and a urethane emulsion.

3. The tire puncture sealant set according to claim 1, wherein the antifreezing agent is at least one of ethylene glycol, propylene glycol, diethylene glycol, glycerin, methanol, ethanol, and isopropyl alcohol.

4. The tire puncture sealant set according to claim 1, wherein the liquid coagulant further comprises an antifreezing agent.

5. The tire puncture sealant set according to claim 4, wherein the antifreezing agent is at least one of ethylene glycol, propylene glycol, diethylene glycol, glycerin, methanol, ethanol, and isopropyl alcohol.

6. A method of coagulating a tire puncture sealant remaining in a pneumatic tire, comprising the step of:
    injecting a liquid coagulant into a punctured tire, in which the tire puncture sealant is remaining, without removing the tire from a rim,
    wherein the tire puncture sealant includes a natural rubber latex, a synthetic resin emulsion and an antifreezing agent,
    wherein the liquid coagulant includes a blowing agent for foaming the tire puncture sealant, and the blowing agent is one of a reactive blowing agent using a urethane resin and/or an acrylic resin having two or more carboxy groups and a hydrogencarbonate salt; and a reactive blowing agent using a polyisocyanate compound, and
    wherein the blowing agent causes in-situ coagulation of the tire puncture sealant, leaving no liquid components in the tire.

* * * * *